United States Patent
Nishimura et al.

(10) Patent No.: US 6,327,530 B1
(45) Date of Patent: Dec. 4, 2001

(54) APPARATUS AND METHOD FOR CONTROLLING A DISTANCE BETWEEN TWO TRAVELING VEHICLES AND A RECORDING MEDIUM FOR STORING THE CONTROL METHOD

(75) Inventors: Takao Nishimura, Nagoya; Eiji Teramura, Okazaki; Akira Isogai, Anjo, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/352,841

(22) Filed: Jul. 13, 1999

(30) Foreign Application Priority Data

Jul. 13, 1998 (JP) .................................................. 10-197599

(51) Int. Cl.$^7$ ..................................................... G06F 15/50
(52) U.S. Cl. ........................... 701/96; 701/301; 342/455; 340/903
(58) Field of Search ............................ 701/96, 300, 301; 180/170; 342/455; 340/903, 435

(56) References Cited

U.S. PATENT DOCUMENTS

| | | | |
|---|---|---|---|
| 5,396,426 | * 3/1995 | Hibino et al. | 701/96 |
| 5,485,155 | 1/1996 | Hibino | 342/70 |
| 5,574,463 | 11/1996 | Shirai et al. | 342/70 |
| 5,627,511 | 5/1997 | Takagi et al. | 340/435 |
| 5,631,639 | 5/1997 | Hibino et al. | 340/903 |
| 5,684,473 | 11/1997 | Hibino et al. | 340/903 |
| 5,710,565 | 1/1998 | Shirai et al. | 342/70 |
| 5,751,211 | 5/1998 | Shirai et al. | 340/435 |
| 5,754,099 | 5/1998 | Nishimura et al. | 340/435 |
| 5,798,727 | 8/1998 | Shirai et al. | 342/70 |
| 5,805,527 | 9/1998 | Hoashi et al. | 367/99 |
| 5,818,355 | 10/1998 | Shirai et al. | 340/903 |
| 5,864,391 | 1/1999 | Hosokawa et al. | 356/4.01 |

FOREIGN PATENT DOCUMENTS

| | | |
|---|---|---|
| 4-238741 | 8/1992 | (JP) . |
| 4-238744 | 8/1992 | (JP) . |
| 6-305340 | 11/1994 | (JP) . |
| 7-125562 | 5/1995 | (JP) . |
| 9-202157 | 8/1997 | (JP) . |

* cited by examiner

Primary Examiner—William A. Cuchlinski, Jr.
Assistant Examiner—Arthur D. Donnelly
(74) Attorney, Agent, or Firm—Pillsbury Winthrop LLP

(57) ABSTRACT

A control ratio ($\gamma$) of a distance deviation ($\Delta d$) to a target distance (dm) is obtained to control a space between two traveling vehicles. The distance deviation ($\Delta d$) is the difference between an actual distance (d) and the target distance (dm). A target control quantity, such as acceleration, engine torque or vehicle speed, is determined in accordance with the obtained control ratio ($\gamma$) so as to equalize the actual distance (d) to the target distance (dm).

24 Claims, 11 Drawing Sheets

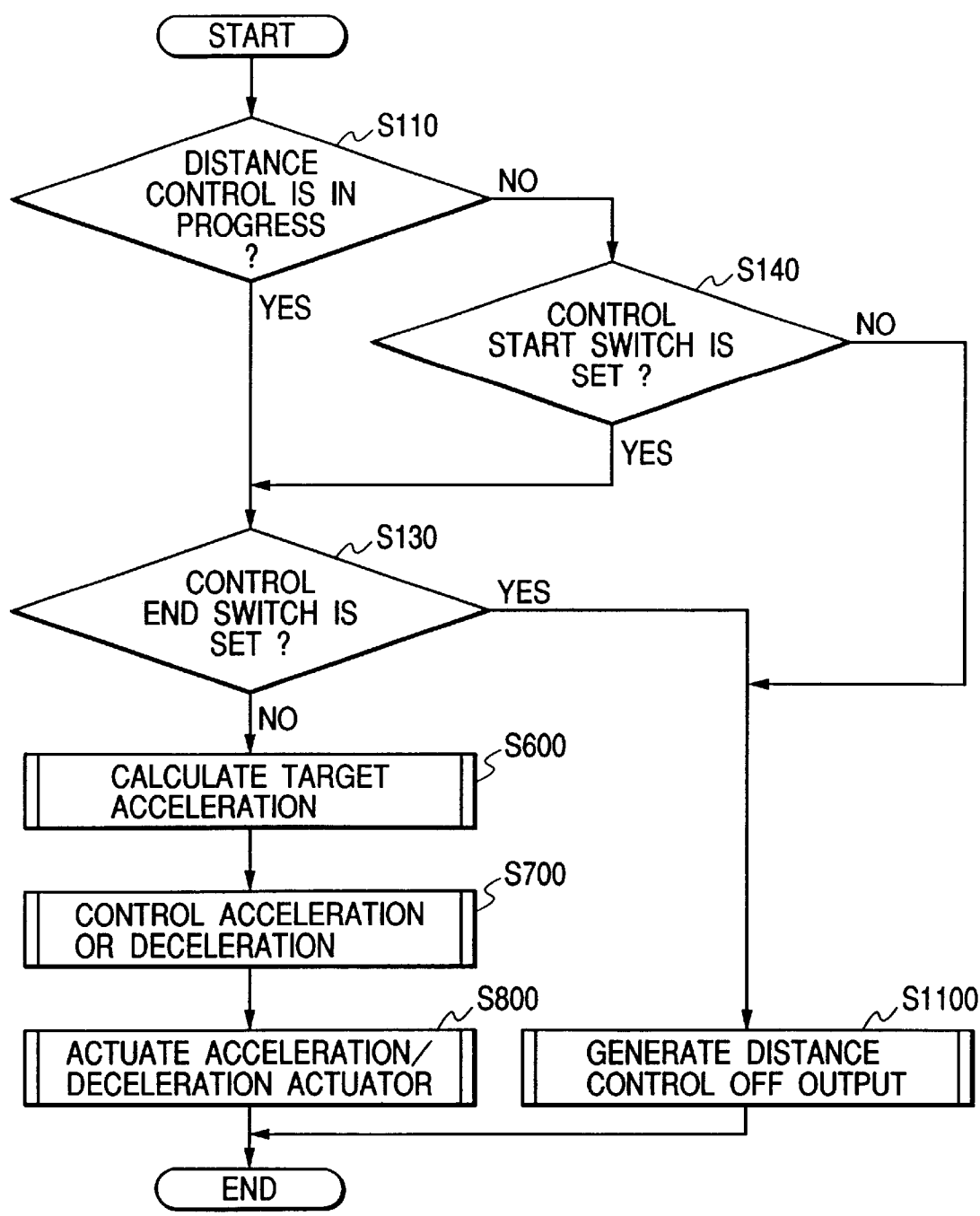

TARGET ACCELERATION CALCULATION SUBROUTINE

FIG. 11 PRIOR ART
(1A) IN CASE OF LONG TARGET DISTANCE
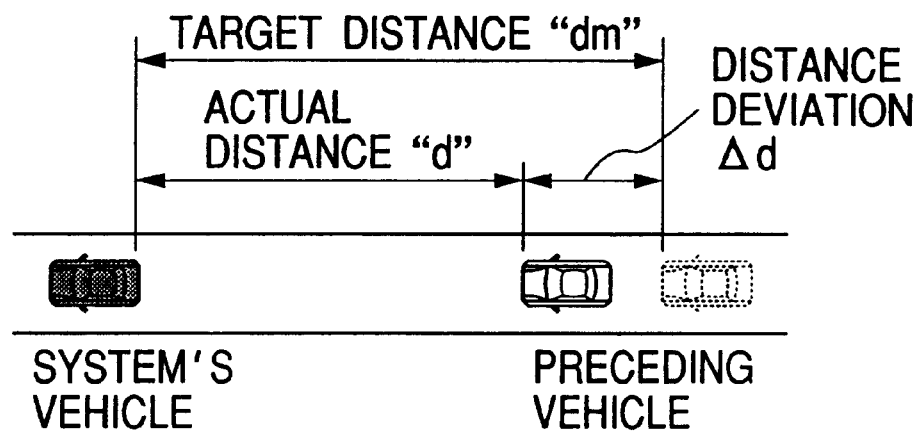
(1B) IN CASE OF SHORT TARGET DISTANCE
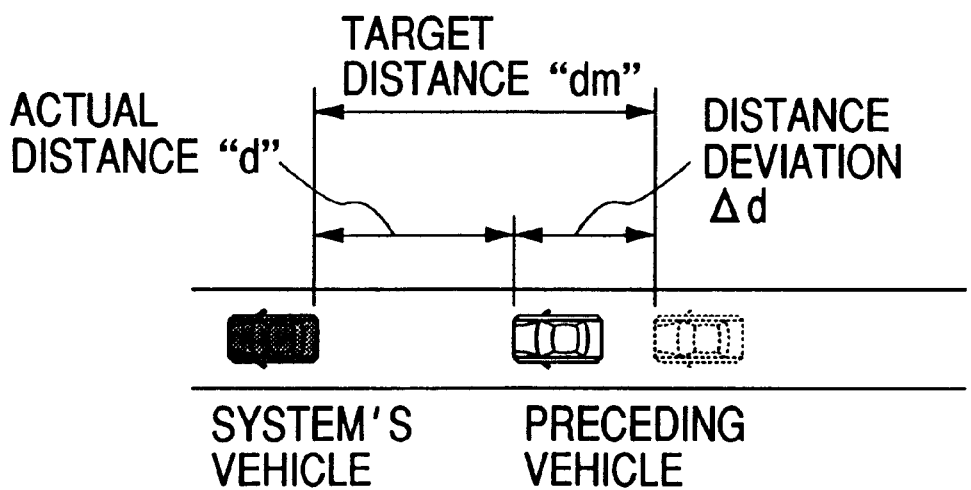

FIG. 13
(2A) IN CASE OF LONG TARGET DISTANCE
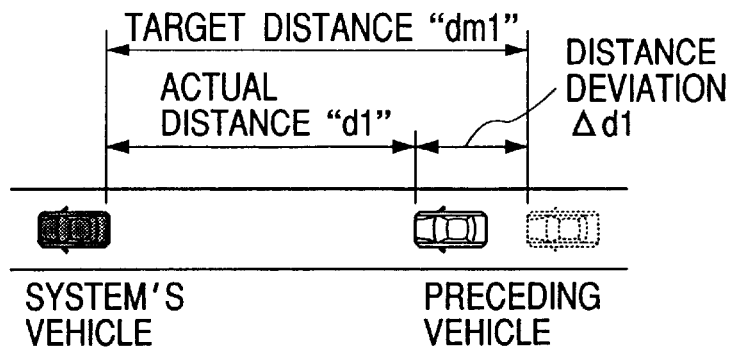
(2B) IN CASE OF SHORT TARGET DISTANCE
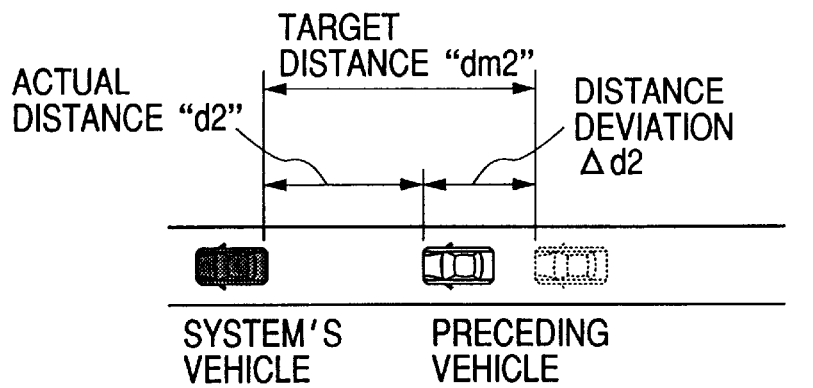
$\Delta d1 = \Delta d2$, $|(d1-dm1)/dm1| < |(d2-dm2)/dm2|$
(2C) IN CASE OF SHORT TARGET DISTANCE
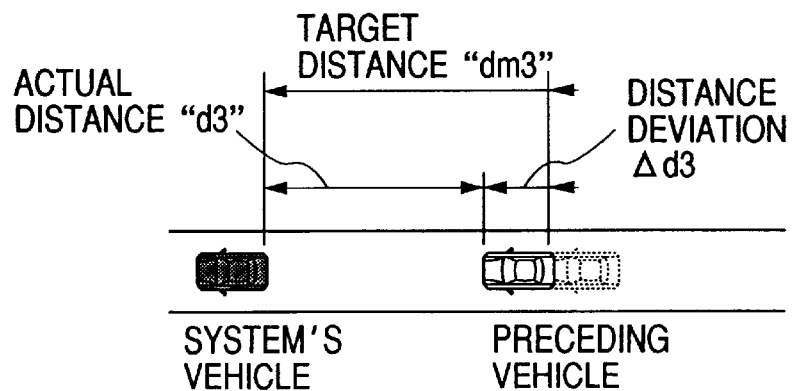
$|(d1-dm1)/dm1| = |(d3-dm3)/dm3|$

APPARATUS AND METHOD FOR CONTROLLING A DISTANCE BETWEEN TWO TRAVELING VEHICLES AND A RECORDING MEDIUM FOR STORING THE CONTROL METHOD

BACKGROUND OF THE INVENTION

The present invention relates to an apparatus and a method for controlling a distance between two traveling vehicles and a recording medium for storing the control method.

To improve the safety in a vehicle driving operation and reduce the driver's burden, an apparatus for automatically controlling a distance between two traveling vehicles is conventionally proposed. For example, a relative speed between the system's vehicle and a preceding vehicle is obtained. A target distance is determined in accordance with the detected relative speed (i.e., speed deviation between two vehicles). An actual distance between the system's vehicle and the preceding vehicle is detected. To eliminate the distance deviation between the actual distance and the target distance, an appropriate target acceleration is set to control an internal combustion engine of the vehicle and/or a braking apparatus so as to realize the target acceleration.

The target distance is fixed to a predetermined value when the vehicle speed is constant. The target distance is changeable in accordance with the change of the vehicle speed. The target acceleration is thus calculated based on the distance deviation between the actual distance and the target distance corresponding to the present vehicle speed.

In other words, when the distance deviation is a same value, a same target acceleration is obtained regardless of the difference in the target distance set by the driver. This makes drivers uncomfortable.

For example, the driver may set a relatively long target distance in a first driving condition and a relatively short target distance in a second driving condition. It is assumed that the distance deviation is same for both cases. In this case, unless there are any other different conditions, the same target acceleration will be obtained for both cases.

However, it depends on the target distance whether the driver preferably accepts the obtained target acceleration or not. More preferably, the driver may think that the obtained target acceleration is preferable when he or she selects the relatively long target distance. However, this driver possibly feels that the same target acceleration is inappropriate when he or she selects the relatively short target distance. On the other hand, other drivers may think that the obtained target acceleration is inappropriate for the relatively long target distance and rather preferable for the relatively short target distance.

When the target acceleration is appropriate for maintaining the long target distance, the same target acceleration will be too moderate or dull for the system's vehicle to approach to or depart from the preceding vehicle to maintain the short target distance. On the contrary, when the target acceleration is appropriate for maintaining the short target distance, the same target acceleration will be too abrupt or steep for the system's vehicle to approach to or depart from the preceding vehicle to maintain the long target distance.

It is believed that such problems come from the improperness of the conventional distance control method because the absolute value of the distance deviation is solely used to control the target acceleration of the system's vehicle.

SUMMARY OF THE INVENTION

In view of the foregoing, the present invention has an object to solve the problems caused by the conventional distance control method.

An object of the present invention is to provide a control apparatus and a method capable of optimizing the vehicle behavior during the distance control so as to fit to driver's feeling and also to provide the vehicle automatic control accepted by every driver.

An object of the present invention is to provide an apparatus and a method for controlling the distance between two traveling vehicles based on a predesignated control ratio, such as a ratio of a distance deviation to the target distance.

An object of the present invention is to provide a recording medium for storing a computer program relating to the distance control method realized by the present invention.

To accomplish the above and other related objects, one aspect of the present invention provides a distance control apparatus for controlling a space between two traveling vehicles. The control apparatus comprises an acceleration/deceleration means for accelerating and decelerating a vehicle. A relative speed detecting means is provided for obtaining a relative speed between two traveling vehicles. A control ratio detecting means is provided for obtaining a control ratio of an actual value to a target value. A target control value generating means is provided for generating a target control value required for controlling the space between the two traveling vehicles. The target control value is determined based on the control ratio obtained by the control ratio detecting means in addition to the relative speed obtained by the relative speed detecting means. A control means is provided for activating the acceleration/deceleration means in accordance with the target control value generated by the target control value generating means.

Preferably, the actual value is a value directly or indirectly representing an actual distance between the two traveling vehicles, and the target value is a value directly or indirectly representing a target distance between the two traveling vehicles.

For example, the actual value is the actual distance itself and the target value is the target distance itself. When the actual distance is 90 m and the target distance is 100 m, the control ratio becomes $9/10$ (=$90/100$). In this case, the control ratio represents the degree of how the system's vehicle is positioned closely to the target position. When the control ratio is 1, the actual distance is equal to the target distance. Thus, the acceleration/deceleration means is controlled so as to equalize the control ratio to 1.0.

According to a preferred embodiment of the present invention, the actual value is a distance deviation between the actual distance and the target distance, and the target value is the target distance. The control ratio becomes $-1/10$ (=(90-100)/100) when the actual distance is 90 m and the target distance is 100 m. In this case, the acceleration/deceleration means is controlled so as to equalize the control ratio to 0.

According to another preferred embodiment of the present invention, the actual value is an actual time interval obtained by dividing the actual distance by a present vehicle speed, and the target value is a target time interval obtained by dividing the target distance by the present vehicle speed.

According to another preferred embodiment of the present invention, the actual value is a time interval deviation between the actual time interval and the target time interval, and the target value is the target time interval.

Regarding the target control value for the acceleration/deceleration means, it is preferable to select the target control value from the group consisting of a target acceleration, a target torque, and a target vehicle speed.

Another aspect of the present invention provides a distance control method for controlling a space between two traveling vehicles. According to the control method of the present invention, a relative speed between two traveling vehicles is obtained. A control ratio of an actual value to a target value is obtained. A target control value required for controlling the space between the two traveling vehicles is generated based on the control ratio in addition to the relative speed. An acceleration/deceleration means is actuated in accordance with the target control value.

Another aspect of the present invention provides a recording medium storing a control program for controlling the space between two traveling vehicles in accordance with the present invention.

BRIEF DESCRIPTION OF THE DRAWINGS

The above and other objects, features and advantages of the present invention will become more apparent from the following detailed description which is to be read in conjunction with the accompanying drawings, in which:

FIG. 2 is a flowchart showing a main processing procedure of the distance control apparatus in accordance with the preferable embodiment of the present invention;

FIG. 11 is a view illustrating a conventional distance control method;

FIG. 13 is a view illustrating a distance control realized by the present invention.

DESCRIPTION OF THE PREFERRED EMBODIMENT

A preferred embodiment of the present invention will be explained with reference to attached drawings.

Figure 1:
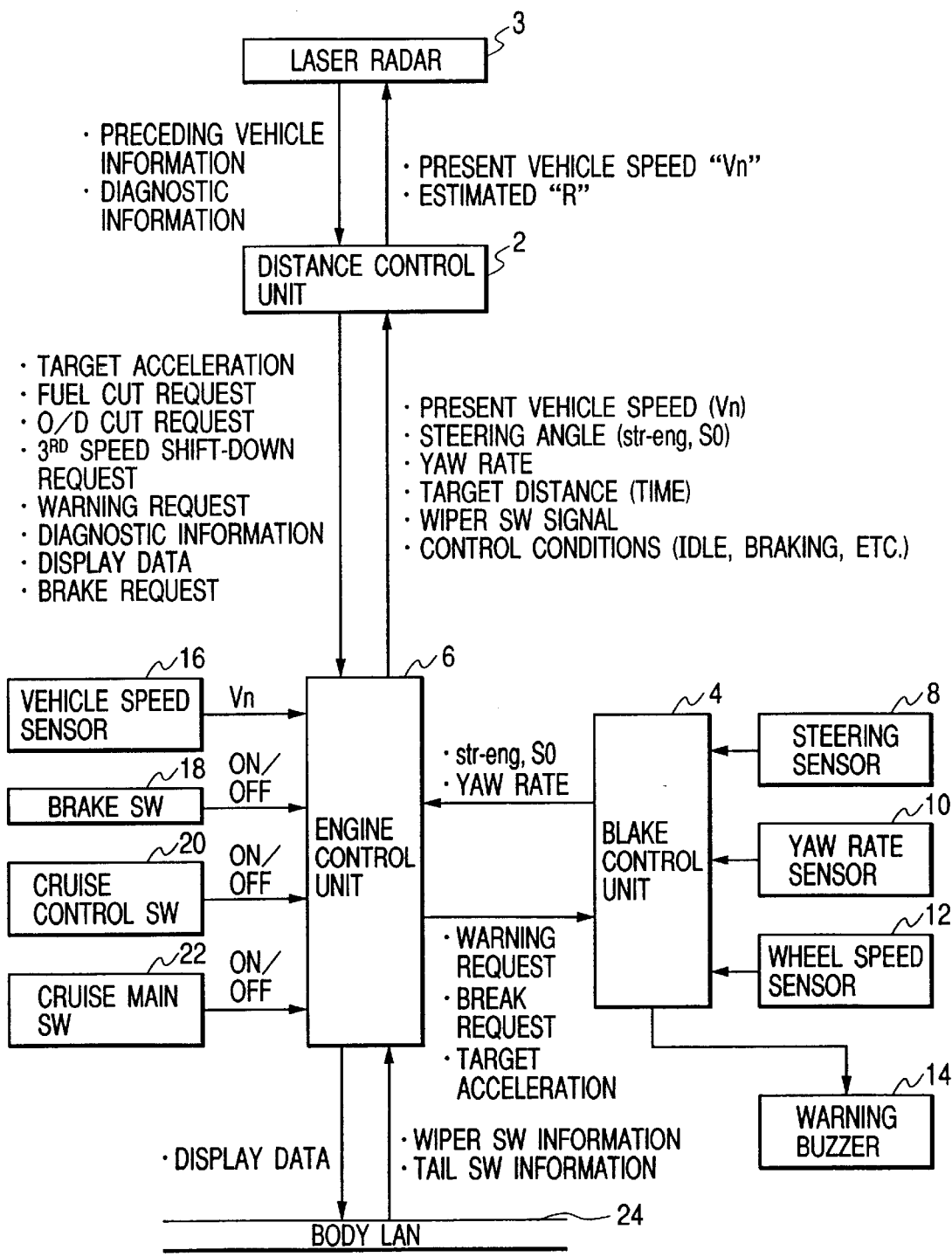
FIG. 1 is a block diagram showing a schematic system arrangement of a distance control apparatus for controlling the space between two traveling vehicles in accordance with a preferable embodiment of the present invention.

FIG. 1 shows an integrated control system of an automotive vehicle, comprising a distance control unit 2 for electronically controlling a space between two traveling vehicles, a brake control unit 4 for electronically controlling the braking device of the automotive vehicle, and an engine control unit 6 for controlling an internal combustion engine of the automotive vehicle.

The distance control unit 2 is an electronic circuit including a microcomputer connected to the engine control unit 6 and installed in an automotive vehicle (hereinafter referred to as a system's vehicle). The distance control unit 2 receives a present vehicle speed (Vn) signal, a steering angle (str-eng, S0) signal, a yaw rate signal, a target time signal, a wiper switch signal, and various control signals, such as engine idling control and brake control signals, from the engine control unit 6. The distance control unit 2 estimates a curvature radius "R" of the road and calculates a distance or interval from the system's vehicle to a preceding vehicle.

A laser radar 3 is an electronic circuit including a laser distance scanner and a microcomputer. The laser distance scanner detects an angle of the preceding vehicle as well as a relative speed of the system's vehicle with respective to the preceding vehicle. The laser radar 3 functions as part of the distance control unit 2. For example, the laser radar 3 calculates the probability of both the preceding vehicle and the system's vehicle traveling on the same running zone or lane of the traveling road based on the present vehicle (Vn) signal and the estimated curvature radius "R" of the traveling road. The calculated result is sent as the preceding vehicle information to the distance control unit 2. The preceding vehicle information includes the detected relative speed between the system's vehicle and the preceding vehicle. Furthermore, the laser radar 3 performs diagnosis and sends a resultant diagnosis signal to the distance control unit 2.

The laser distance scanner irradiates a laser beam directed to the traveling direction of the system's vehicle as a transmission radio wave with a predetermined scanning angle and receives the laser beam reflected from a detected object. The laser distance scanner calculates the distance between the system's vehicle and the preceding vehicle in relation to the scanning angle.

The distance control unit 2 identifies a preceding vehicle to be recognized as an objective based on the preceding vehicle information received from the laser radar 3. The distance control unit 2 sends various control commands to the engine control unit 6 for adequately adjusting the distance or space between the system's vehicle and the preceding vehicle. The control commands, generated from the distance control unit 2, comprise a target acceleration signal, a fuel cut request signal, an O/D cut request signal, a third-speed shift down request signal, and a brake request signal. Furthermore, the distance control unit 2 performs the judgement for issuing a warning. A warning request signal is sent to the engine control unit 6. A diagnosis signal and a display signal are also sent from the distance control unit 2 to the engine control unit 6.

The brake control unit 4 is an electronic circuit including a microcomputer associated with a steering sensor 8 detecting a steering angle of the system's vehicle, a yaw rate sensor 10 detecting a yaw rate of the system's vehicle, and a wheel speed sensor 12 detecting a rotational speed of each wheel. The brake control unit 4 sends the obtained data, such as the steering angle and the yaw rate of the system's vehicle, to the distance control unit 2 via the engine control unit 6. The brake control unit 4 receives the control commands, such as the target acceleration signal and the brake request signal, from the distance control unit 2 via the engine control unit 6. A hydraulic braking pressure is controlled by a brake actuator (not shown) in accordance with the control commands. The brake control unit 4 also receives the warning request signal from the distance control unit 2 via the engine control unit 6. The brake control unit 4 actuates a warning buzzer 14 in response to the warning request signal.

The engine control unit 6 is an electronic circuit including a microcomputer associated with a vehicle speed sensor 16 detecting a present vehicle speed (Vn), a brake switch 18 detecting the depression of a braking pedal, a cruise control switch 20, and a cruise main switch 22. The engine control unit 6 further receives various detecting signals obtained from other sensors and switches. A body LAN 24 is connected to the engine control unit 6 to transmit a wiper switch signal and a tail switch signal to the engine control unit 6. The engine control unit 6 is connected to the brake control unit 4 to receive the steering angle (str-eng, S0) signal and the yaw rate signal. The engine control unit 6 is connected to the distance control unit 2 to receive the target acceleration signal, the fuel cut signal, the O/D cut request signal, the third-speed shift down request signal, the brake request signal, the warning request signal, the diagnosis signal, and the display data signal.

The engine control unit 6 controls a throttle actuator (not shown) and a transmission actuator (not shown) in accordance with the received signals representing the driving conditions. The engine control unit 6 transmits display information to a display unit (not show), such as an LCD, through the body LAN 24. Furthermore, the engine control unit 6 transmits the present vehicle speed (Vn) signal, the steering angle (str-eng, S0) signal, the yaw rate signal, the target time signal, the wiper switch signal, and various control signals, such as engine idling control and brake control signals, to the distance control unit 2.

The transmission (not shown) is a five-speed automatic transmission with a fourth-speed stage of a reduction ratio=1 and a fifth-speed stage of a reduction ratio=0.7, which is generally referred to as a "4 speeds+overdrive (O/D)" transmission. In this case, the reduction ratio is defined by a ratio of the rotational speed of the gear to the output speed of the engine.

The detailed operation of the distance control unit 2 is explained with reference to flowcharts shown in FIGS. 2 to 10.

FIG. 2 is a flowchart showing the main processing procedure performed in the distance control unit 2. First, in step S110, it is checked whether the distance control is in progress or not. If the control is not started yet (NO in the step S110), it is checked in step S140 whether a control start switch is set or not. In this embodiment, the cruise control switch 20 functions as the control start switch. When the cruise control switch 20 is turned on, the judgement of the step 140 becomes YES. If the control start switch is not set yet (NO in the step S140), distance control off output signals are generated in a step S1100 and then the main processing procedure is terminated.

If the control start switch is already set (YES in the step S140), the control flow proceeds to a step S130. Meanwhile, if the distance control is already started in the step S110, the control flow proceeds to the step S130.

In the step S130, it is checked whether a control end switch is set or not. In this embodiment, the cruise control switch 20 also functions as the control end switch. When the cruise control switch 20 is turned off, the judgement of the step 130 becomes YES. If the control end switch is already set (YES in the step S130), the distance control off output signals are generated in the step S1100 and then the main processing procedure is terminated.

If the control end switch is not set yet (NO in the step S130), the control flow proceeds to sequential steps of S600 (a subroutine for calculating a target acceleration), S700 (a subroutine for controlling the acceleration and deceleration) and S800 (a subroutine for actuating the acceleration/ deceleration apparatus). Then, the main processing procedure is terminated.

Figure 3A:
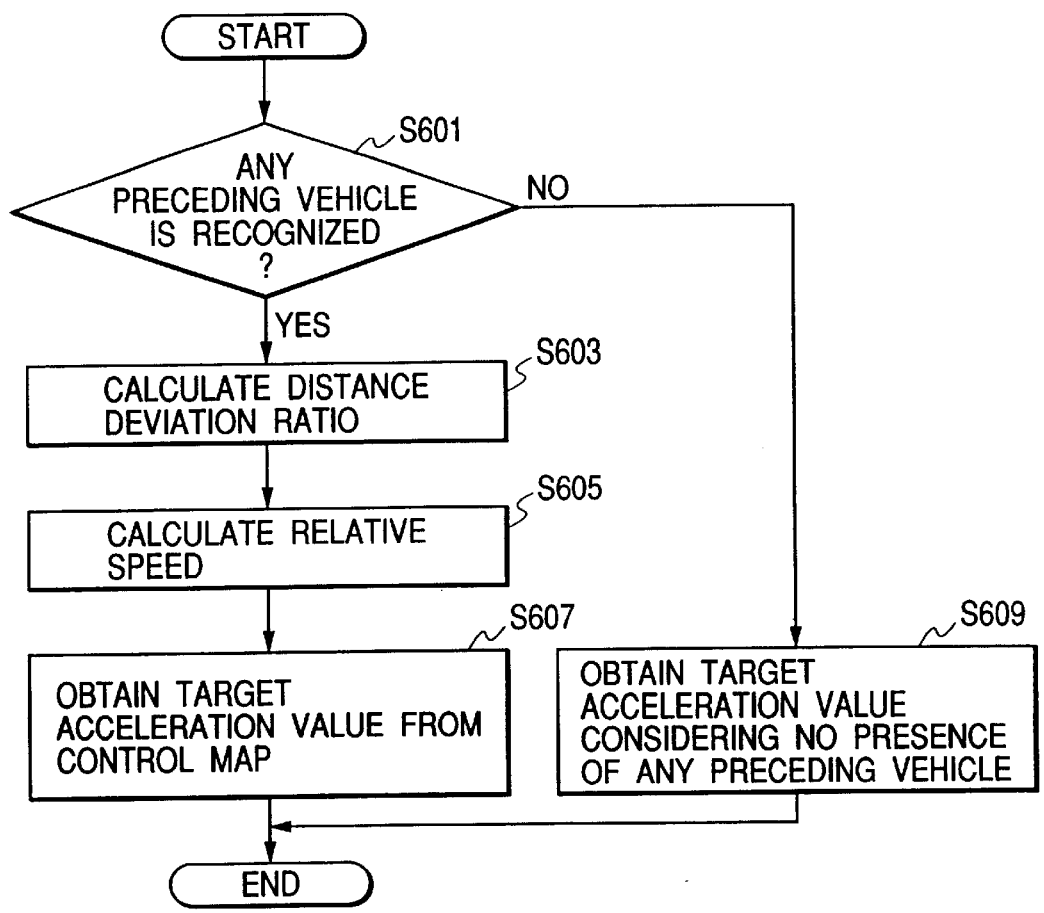
FIG. 3A is a flowchart showing a target acceleration calculating subroutine constituting part of the main processing procedure of the distance control apparatus in accordance with the preferable embodiment of the present invention.

FIG. 3A is a flowchart showing the details of the step S600 which is the subroutine for calculating the target acceleration (or deceleration).

In the step S601, it is checked whether any preceding vehicle is recognized or not. If no preceding vehicle is recognized (NO in the step S601), a target acceleration value is obtained considering no presence of any preceding vehicle in a step S609. Then, this subroutine is completed. If any preceding vehicle is recognized (YES in the step S601), the control flow proceeds to a step S603 to calculate a distance deviation ratio $\gamma$.

The distance deviation ratio $\gamma$ is defined by a ratio of a distance deviation $\Delta d$ (=d−dm) to the target distance dm, when "d" represents an actual distance between the preceding vehicle and the system's vehicle and "dm" represents the target distance between the vehicles.

Then, in the next step S605, a relative speed $\Delta V$ is calculated. The relative speed $\Delta V$ is defined by a difference $(V_p - V_s)$ when $V_p$ represents the vehicle speed of the preceding vehicle and $V_s$ represents the vehicle speed of the system's vehicle.

The processing order of the step S603 and the step S605 can be reversed if required.

Figure 3B:
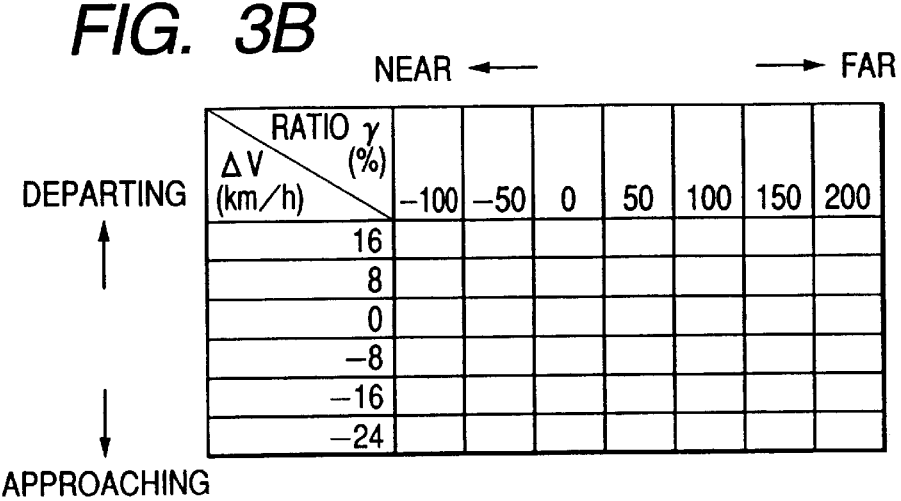
FIG. 3B is a control map used in the target acceleration calculating subroutine.

Then, in the next step S607, a target acceleration value is obtained based on the obtained distance deviation ratio $\gamma$ (step S603) and the obtained relative speed $\Delta V$ (step S605) with reference to a control map shown in FIG. 3B. The control map of FIG. 3B shows a total of seven discrete values for representing the distance deviation ratio $\gamma$, i.e., −100, −50, 0, 50, 100, 150, 200, as well as a total of six discrete values for representing the relative speed $\Delta V$, i.e., 16, 8, 0, −8, −16, −24. Map data are given in relation to these different values. When the obtained distance deviation ratio $\gamma$ and/or the obtained relative speed $\Delta V$ are somewhere between two discrete values, the map data are linearly interpolated to obtain an appropriate control value. When the obtained distance deviation ratio $\gamma$ or the obtained relative speed $\Delta V$ is beyond the designated region of the control map shown in FIG. 3B, the control value is obtained based on the most-closest discrete value (i.e., a value located at the corresponding edge of the control map). Then, this subroutine is completed.

Figure 4:
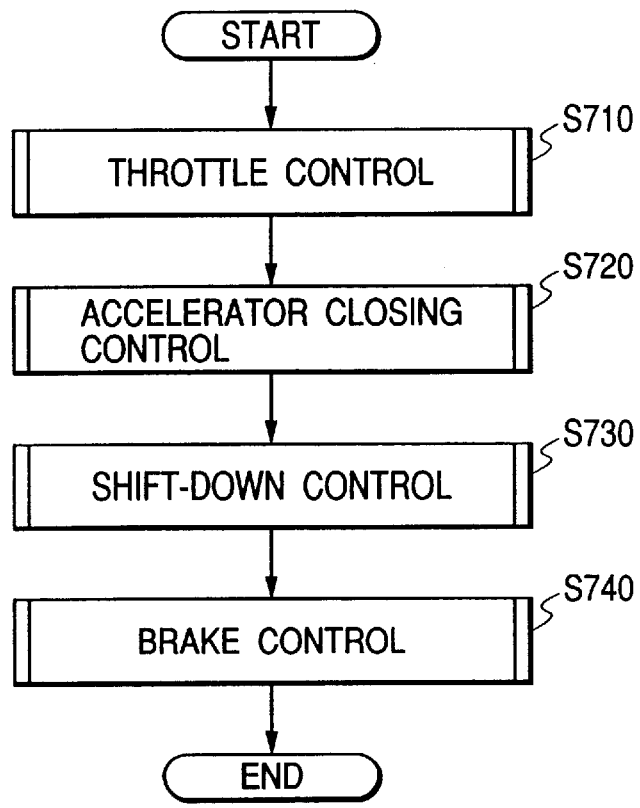
FIG. 4 is a flowchart showing an acceleration/deceleration control subroutine constituting part of the main processing procedure of the distance control apparatus shown in FIG. 2.

FIG. 4 is a flowchart showing the details of the step S700 which is the subroutine for obtaining the target acceleration. This subroutine comprises a throttle control (step S710), an accelerator closing control (step S720), a shift-down control (step S730), and a brake control (step S740) which are sequentially performed.

Figure 5:
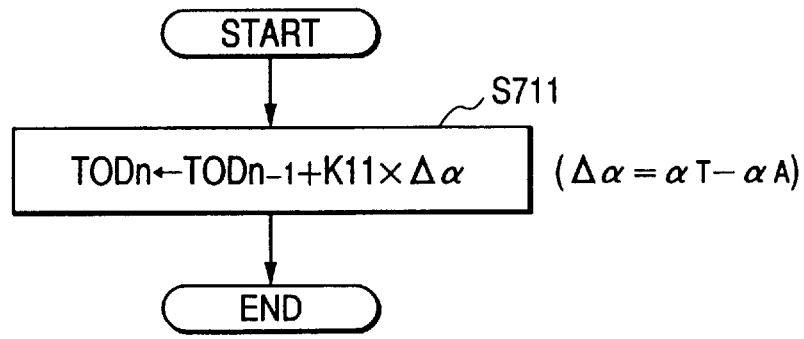
FIG. 5 is a flowchart showing details of a throttle control performed in the acceleration/deceleration control subroutine shown in FIG. 4.

FIG. 5 is a flowchart showing the details of the throttle control of the step S710. More specifically, in a step S711, a present throttle opening degree TODn is obtained by multiplying a throttle control gain K11 with an acceleration deviation $\Delta \alpha$ and adding the obtained multiplied value $K11 \times \Delta \alpha$ to a previous throttle opening degree TODn−1.

$$TODn \leftarrow TODn-1 + K11 \times \Delta\alpha$$

$$\Delta\alpha = \alpha_T - \alpha_A$$

where $\alpha_A$ represents an actual acceleration and $\alpha_T$ represents the target acceleration.

Figure 6:
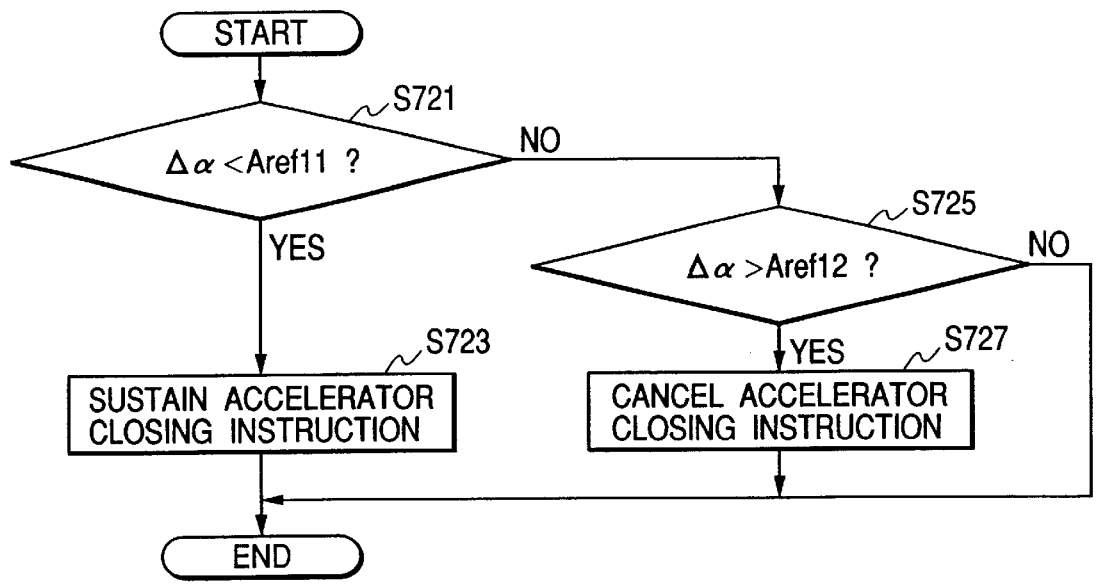
FIG. 6 is a flowchart showing details of an accelerator closing control performed in the acceleration/deceleration control subroutine shown in FIG. 4.

FIG. 6 is a flowchart showing the details of the accelerator closing control of the step S720. More specifically, in a step S721, it is checked whether the acceleration deviation $\Delta\alpha$ is smaller than a first reference value Aref11 or not. If the judgement result is YES in the step S721(i.e., $\Delta\alpha$<Aref11), the control flow proceeds to a step S723 to sustain an accelerator closing instruction. Then, this subroutine is terminated.

If the judgement result is NO in the step S721(i.e., $\Delta\alpha \geq$ Aref11), the control flow proceeds to a step S725 to further check whether the acceleration deviation $\Delta\alpha$ is larger than a second reference value Aref12 or not. The second reference value Aref12 is larger than the first reference value Aref11. If the judgement result is YES in the step S725(i.e., $\Delta\alpha$>Aref12), the control flow proceeds to a step S727 to cancel the accelerator closing instruction. Then, this subroutine is terminated. If the judgement result is NO in the step S725(i.e., $\Delta\alpha \leq$ Aref12), this subroutine is terminated.

Figure 7:
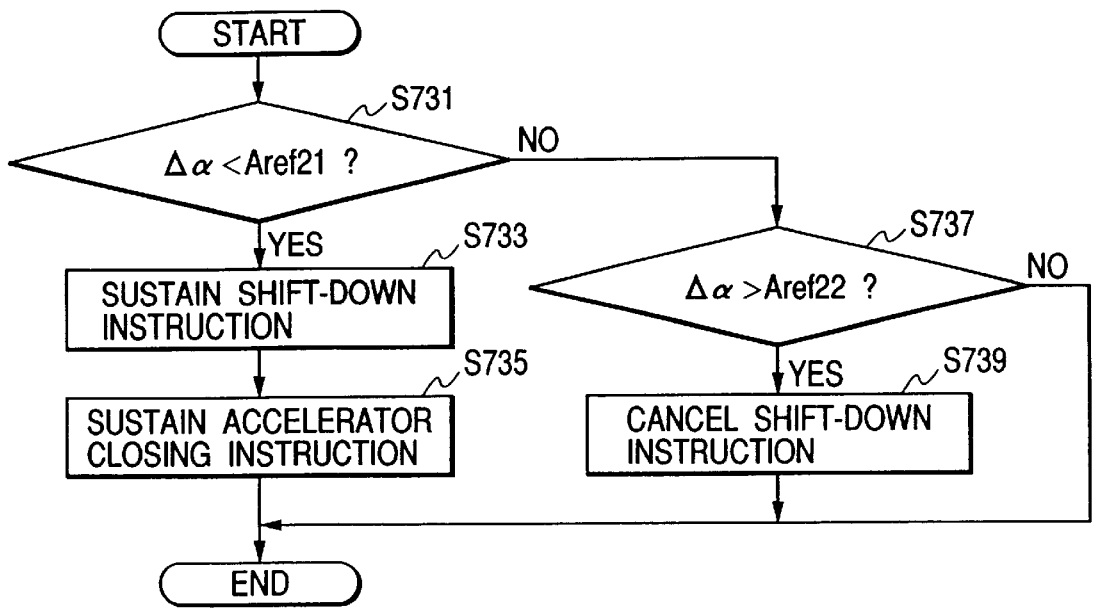
FIG. 7 is a flowchart showing details of a shift-down control performed in the acceleration/deceleration control subroutine shown in FIG. 4.

FIG. 7 is a flowchart showing the details of the shift-down control of the step S730. More specifically, in a step S731, it is checked whether the acceleration deviation $\Delta\alpha$ is smaller than a third reference value Aref21 or not. If the judgement result is YES in the step S731(i.e., $\Delta\alpha$<Aref21), the control flow proceeds to a step S733 to sustain a shift-down instruction. Then, in the next step S735, the accelerator closing instruction is sustained. Then, this subroutine is terminated.

If the judgement result is NO in the step S731(i.e., $\Delta\alpha \geq$ Aref21), the control flow proceeds to a step S737 to further check whether the acceleration deviation $\Delta\alpha$ is larger than a fourth reference value Aref22 or not. The fourth reference value Aref22 is larger than the third reference value Aref21. If the judgement result is YES in the step S737(i.e., $\Delta\alpha$>Aref22), the control flow proceeds to a step S739 to cancel the shift-down instruction. Then, this subroutine is terminated. If the judgement result is NO in the step S737(i.e., $\Delta\alpha \leq$ Aref22), this subroutine is terminated.

Figure 8:
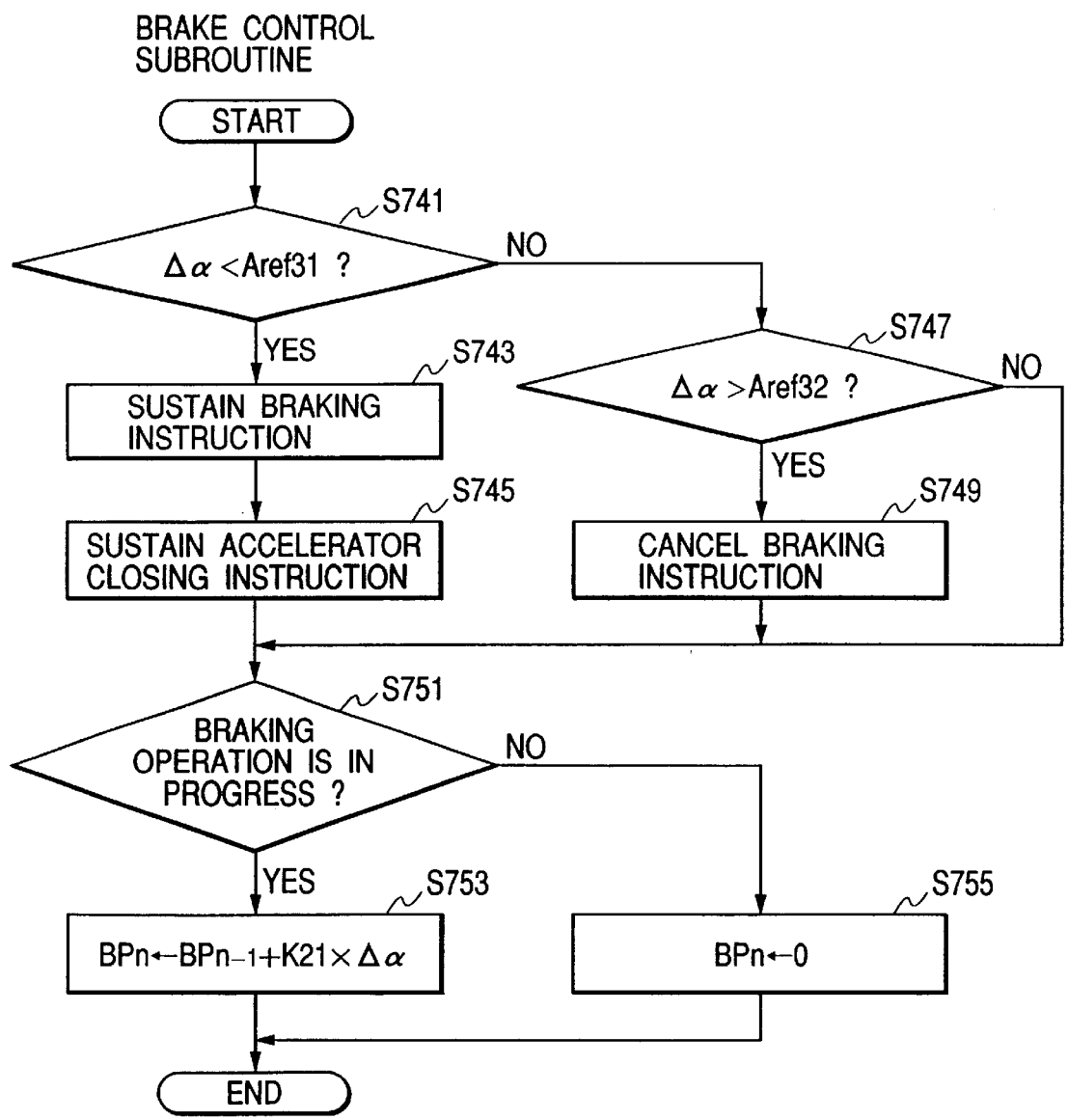
FIG. 8 is a flowchart showing details of a brake control performed in the acceleration/deceleration control subroutine shown in FIG. 4.

FIG. 8 is a flowchart showing the details of the brake control of the step S740. More specifically, in a step S741, it is checked whether the acceleration deviation $\Delta\alpha$ is smaller than a fifth reference value Aref31 or not. If the judgement result is YES in the step S741(i.e., $\Delta\alpha$<Aref31), the control flow proceeds to a step S743 to sustain a braking instruction. Then, in the next step S745, the accelerator closing instruction is sustained. Then, the control flow proceeds to a step S751.

If the judgement result is NO in the step S741(i.e., $\Delta\alpha$>Aref31), the control flow proceeds to a step S747 to further check whether the acceleration deviation $\Delta\alpha$ is larger than a sixth reference value Aref32 or not. The sixth reference value Aref32 is larger than the fifth reference value Aref31. If the judgement result is YES in the step S747(i.e., $\Delta\alpha$>Aref32), the control flow proceeds to a step S749 to cancel the braking instruction. Then, the control flow proceeds to the step S751. If the judgement result is NO in the step S747(i.e., $\Delta\alpha \leq$ Aref32), the control flow directly proceeds to the step S751.

In the step S751, it is checked whether the braking operation is in progress or not. If the judgement result is YES in the step S751, the control flow proceeds to a step S753 to obtain a present braking pressure value. The present braking pressure BPn is obtained by multiplying a brake control gain K21 with the acceleration deviation $\Delta\alpha$ and adding the obtained multiplied value K21×$\Delta\alpha$ to a previous braking pressure BPn-1.

$$BPn \leftarrow BPn-1 + K21\Delta\alpha$$

If the judgement result is NO in the step S751, the control flow proceeds to a step S755 to equalize the present braking pressure to 0, i.e., BPn=0. After finishing the steps S753 and S755, this subroutine is completed.

Figure 9:
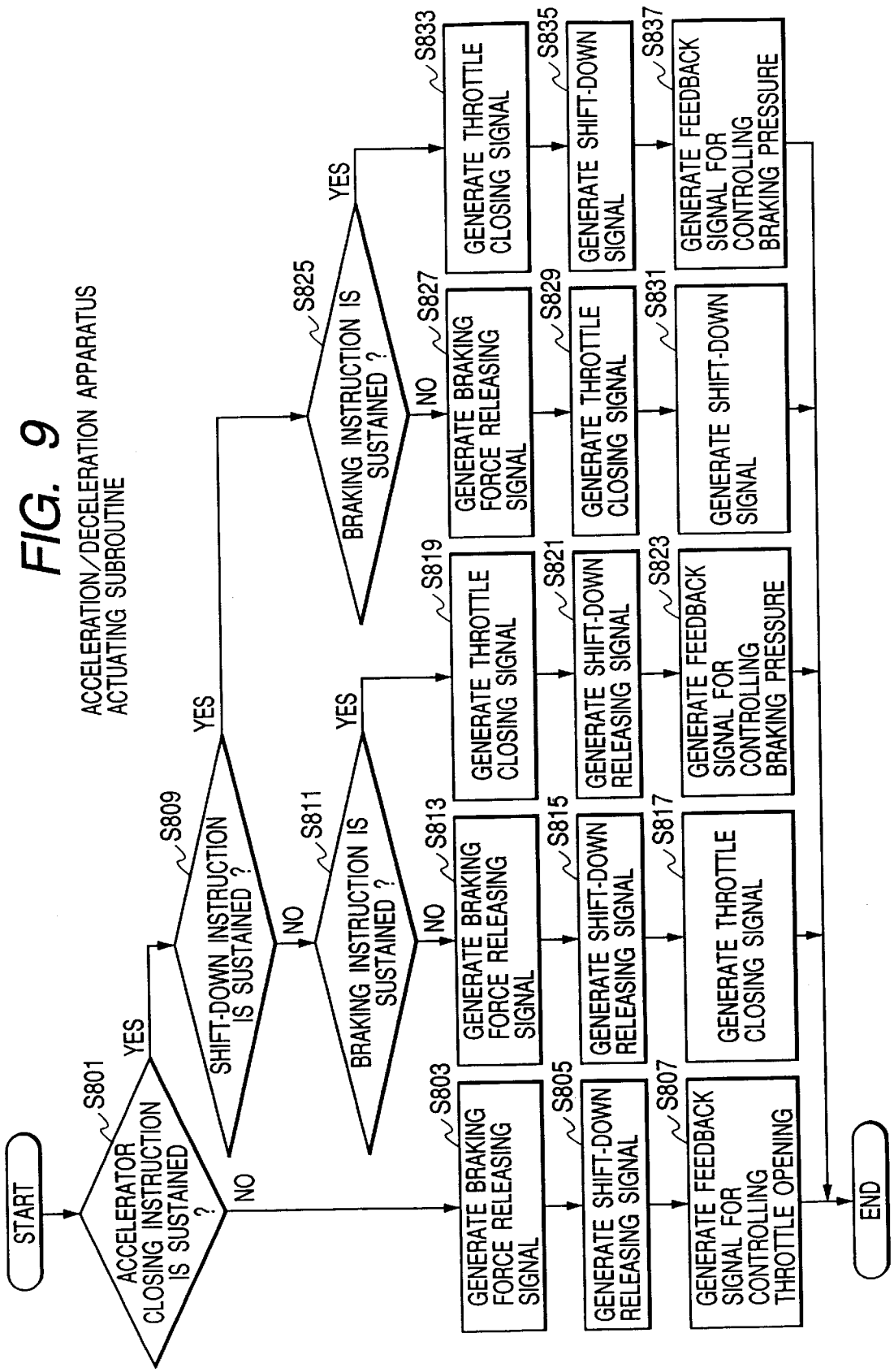
FIG. 9 is a flowchart showing an acceleration/deceleration actuator control subroutine constituting part of the main processing procedure of the distance control shown in FIG. 2.

FIG. 9 is a flowchart showing the details of the step S800 which is the subroutine for actuating the acceleration/deceleration actuator.

In a step S801, it is checked whether the accelerator closing instruction is sustained or not. If the accelerator closing instruction is canceled (i.e., NO in the step S801), the control flow proceeds to steps S803, S805 and S807 which are sequentially performed. In the step S803, a braking force releasing signal is generated. In the step S805, a shift-down releasing signal is generated. In the step S807, a feedback signal for controlling a throttle opening is generated. Then, this subroutine is terminated.

Meanwhile, if the accelerator closing instruction is sustained (i.e., YES in the step S801), the control flow proceeds to a step S809 to further check whether the shift-down instruction is sustained or not. If the shift-down instruction is canceled (i.e., NO in the step S809), the control flow proceeds to a step 811 to further check whether the braking instruction is sustained or not. If the braking instruction is canceled (i.e., NO in the step S811), the control flow proceeds to steps S813, S815 and S817 which are sequentially performed. In the step S813, the braking force releasing signal is generated. In the step S815, the shift-down releasing signal is generated. In the step S817, a throttle closing signal is generated to completely close the throttle valve. Then, this subroutine is terminated.

If the braking instruction is sustained (i.e., YES in the step S811), the control flow proceeds to steps S819, S821 and S823 which are sequentially performed. In the step S819, the throttle closing signal is generated to completely close the throttle valve. In the step S821, the shift-down releasing signal is generated. In the step S823, a feedback signal for controlling the braking pressure is generated. Then, this subroutine is terminated.

Meanwhile, if the shift-down instruction is sustained (i.e., YES in the step S809), the control flow proceeds to a step 825 to further check whether the braking instruction is sustained or not. If the braking instruction is canceled (i.e., NO in the step S827), the control flow proceeds to steps S827, S829 and S831 which are sequentially performed. In the step S827, the braking force releasing signal is generated. In the step S829, the throttle closing signal is generated to completely close the throttle valve. In the step S831, the shift-down signal is generated to actuate the transmission actuator to realize a designated shift-down operation. Then, this subroutine is terminated.

If the braking instruction is sustained (i.e., YES in the step S825), the control flow proceeds to steps S833, S835 and S837. In the step S833, the throttle closing signal is generated to completely close the throttle valve. In the step S835, the shift-down signal is generated to actuate the transmission actuator to realize the designated shift-down operation. In the step S837, the feedback signal for controlling the braking pressure is generated. Then, this subroutine is terminated.

Figure 10:
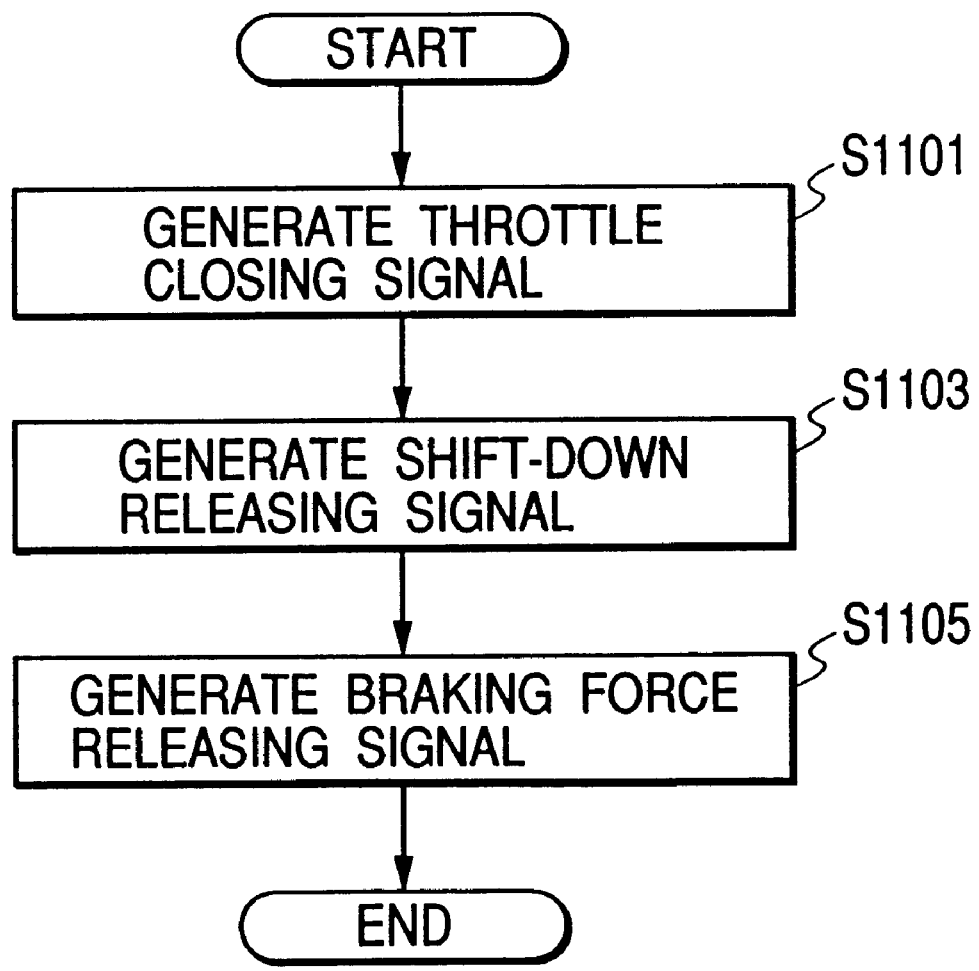
FIG. 10 is a flowchart showing a distance control off output generating subroutine shown in FIG. 2.

FIG. 10 is a flowchart showing the details of the step S1100 which is the subroutine for generating the distance control off output signals. This subroutine shows a processing procedure executed when the acceleration/deceleration actuator receives no instructions for the acceleration and/or deceleration.

In a step S1101, the throttle closing signal is generated to completely close the throttle valve. Then, in a step S1103, the shift-down releasing signal is generated. Then, in a step S1105, the braking force releasing signal is generated. Then, this subroutine is terminated.

For comparison between the present invention and the prior art, a conventional distance control will be first explained with reference to FIGS. 11 and 12.

According to the conventional distance control, the target distance between two traveling vehicles is maintained at the same value when the vehicle speed is constant.

For example, the operator (i.e., driver) may set a relatively long target distance "dm" (e.g., 100 m) as shown in a case 1A of FIG. 11 or set a relatively short target distance "dm" (e.g., 50 m) as shown in a case 1B of FIG. 11. It is assumed that a distance deviation Δd (=d−dm) is same (e.g., −10 m) for both cases 1A and 1B. In this condition, unless there are any other different conditions, the same target acceleration is obtained for both cases 1A and 1B.

However, it depends on the target distance whether the operator preferably accepts the obtained target acceleration or not. More preferably, the operator may think that the obtained target acceleration is preferable when he or she selects the relatively long target distance "dm" as shown in the case 1A. However, this operator possibly feels that the same target acceleration is inappropriate when he or she selects the relatively short target distance "dm" as shown in the case 1B. On the other hand, for other operators, the obtained target acceleration may be inappropriate for the relatively long target distance "dm" shown in the case 1A and rather preferable for the relatively short target distance "dm" shown in the case 1B.

For example, when the target acceleration is appropriate for maintaining the long target distance, the same target acceleration will be too moderate or dull when the system's vehicle follows up the preceding vehicle to maintain the short target distance. On the contrary, when the target acceleration is appropriate for maintaining the short target distance, the same target acceleration will be too abrupt or steep when the system's vehicle follows up the preceding vehicle to maintain the long target distance.

These problems come from the improperness of the conventional distance control because the absolute value of the distance deviation Δd is solely used to obtain the target acceleration of the system's vehicle.

Figure 12:
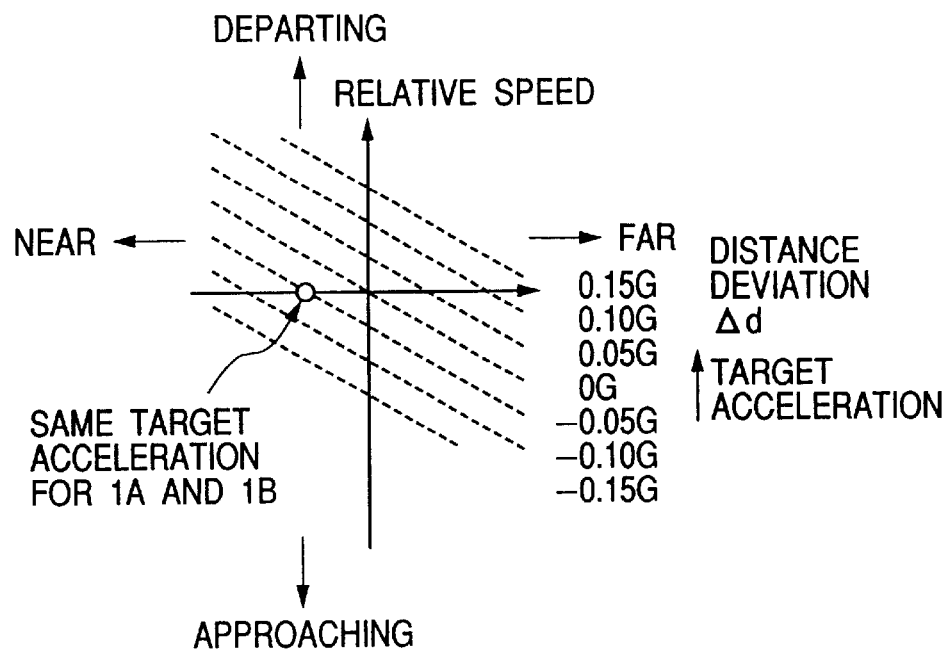
FIG. 12 is a control map showing the result of the conventional distance control.

As apparent from the control map shown in FIG. 12, when the same relative speed is given, the same target acceleration is obtained for the same distance deviation Δd regardless of the difference in the target distance "dm" (i.e., regardless of the difference between 100 m and 50 m).

Figure 14:
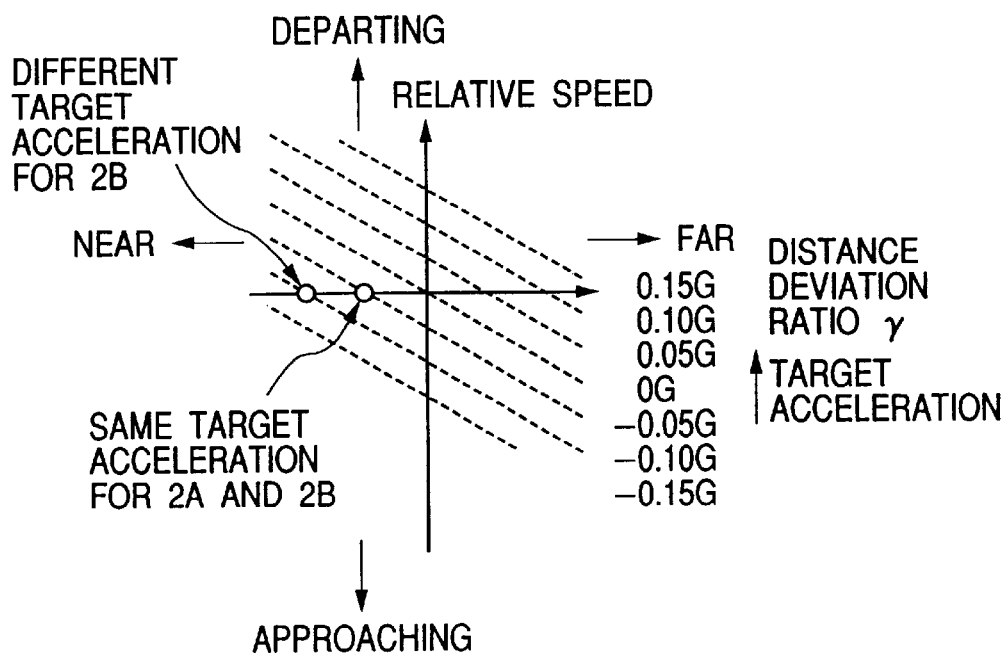
FIG. 14 is a control map showing the result of the distance control of the present invention.

On the other hand, as apparent from the control map shown in FIG. 14, the present invention uses the distance deviation ratio γ to obtain the target acceleration. As explained above, the distance deviation ratio γ is defined by the ratio of the distance deviation Δd (=d−dm) to the target distance dm, when "d" represents the actual distance between the preceding vehicle and the system's vehicle and "dm" represents the target distance between the vehicles.

$$\gamma = \Delta d/dm$$

In short, the present invention introduces a new measure for controlling the acceleration/deceleration actuator in a distance control between two raveling vehicles. More specifically, the acceleration/deceleration actuator is controlled in response to the change in the ratio (γ) of the distance deviation (Δd) to the target distance (dm).

As shown in FIG. 13, it is assumed that the distance deviation Δd is the same (e.g., Δd1=Δd2=−10 m) in both cases 2A and 2B. When the target distance "dm" is long (e.g., dm1=100 m), the distance deviation ratio γ is −1/10(=−10/100). When the target distance "dm" is short (e.g., dm2=50 m), the distance deviation ratio γ is −1/5 (=−10/50). The target acceleration values corresponding to the different distance deviation ratio (γ) values −1/10 and −1/5 are different from each other as apparent from the control map shown in FIG. 14.

According to the control map shown in FIG. 14, the target acceleration value for the distance deviation ratio γ=1/10 is −0.05G which is moderate or dull compared with −0.10G for the distance deviation ratio γ=−1/5. The present invention changes the target acceleration considering the degree of how the system's vehicle is positioned closer (or farther) to the preceding vehicle. In the case 2A, the system's vehicle is positioned 10% closer to the preceding vehicle than the target position. In the case 2B, the system's vehicle is positioned 20% closer to the preceding vehicle than the target position. Thus, the target deceleration of the case 2B is twice as large as that of the case 2A. This is suitable for the driver's feeling.

FIG. 13 also shows another case 2C where the target distance dm is identical with that of the case 2B (i.e., dm3=dm2=50 m) and the distance deviation ratio γ is identical with that of the case 2A (i.e., γ=−1/5). In this case, the obtained target acceleration is identical with that of the case 2A. Thus, the system's vehicle moderately decelerates so as to keep the target distance between the preceding vehicle and the system's vehicle. The vehicle behavior (e.g., acceleration or deceleration) is the same in each cases 2A and 2C regardless of the difference in the distance deviation Δd (i.e., ↑Δd1|>|Δd3 |) In this manner, the present invention controls the vehicle's behavior in accordance with the distance deviation ratio γ. Thus, it becomes possible to realize an optimum distance control properly fitting to the operator's driving feeling.

The present invention is not limited to the above-described embodiment and can be variously modified.

For example, the distance between two traveling vehicles is replaceable by a time interval between two vehicles. The time interval is obtained by dividing the distance between two vehicles by the vehicle speed of the system's vehicle. In this case, the control map shown in FIG. 3B will be modified by replacing the distance deviation ratio by a time interval deviation ratio. The time interval deviation ratio $\gamma_T$ is defined by a ratio of a time interval deviation ΔT (=T−Tm) to a target time interval Tm, when "T" represents an actual time interval between the preceding vehicle and the system's vehicle and "Tm" represents the target time interval between these vehicles.

$$T=d/V$$

$$Tm=dm/V$$

$$\gamma_T = \Delta T/Tm = (T-Tm)/Tm = (d/V N-dm/V)/dm/V = (d-dm)/dm = \gamma$$

In short, the time interval deviation ratio $\gamma_T$ is identical with the distance deviation ratio γ.

Furthermore, it is possible to replace the distance deviation Δd by the actual distance "d" in obtaining another distance deviation $\Delta_A$.

$$\gamma_A = d/dm = \gamma + 1$$

Moreover, the above-described embodiment uses the target acceleration (or deceleration) as the control value of the acceleration/deceleration actuator for controlling the distance between two traveling vehicles. However, the control value of the present invention is not limited to the target acceleration. For example, the target acceleration is replaceable by a target torque or a target vehicle speed.

More specifically, in the step S600 of FIG. 2, the target torque or the target vehicle speed is calculated instead of calculating the "target acceleration." In the step S607 of FIG. 3A, the target torque or the target vehicle speed is obtained based on the distance deviation ratio γ and the relative speed ΔV with reference to the control map shown in FIG. 3B. In this case, the control map of FIG. 3B is modified to obtain the target torque or the target vehicle speed variation (i.e., a required increase or decrease in the vehicle speed). In the step S609, the target torque or the target vehicle speed is obtained considering no presence of any preceding vehicle.

In the steps S711, S721, S725, S731, S737, S741, S747, S753 and S755, the "acceleration deviation Δα" is replaced by a torque deviation Δτ or a vehicle speed deviation ΔS. The torque deviation Δτ represents a difference between the target torque and the actual (or estimated) torque of the engine. The vehicle speed deviation ΔS represents a difference between the target vehicle speed and the actual vehicle speed.

In this manner, when the torque of the engine is designated as the control value for controlling the distance between two traveling vehicles, an appropriate target torque is obtained from the control map of FIG. 3B and the vehicle behavior is controlled based on the torque deviation between the target torque and the actual (or estimated) torque.

When the vehicle speed is designated as the control value for controlling the distance between two traveling vehicles, an appropriate vehicle speed variation is obtained from the control map of FIG. 3B. The target vehicle speed is obtained by adding the obtained vehicle speed variation to the actual vehicle speed. The vehicle behavior is controlled based on the vehicle speed deviation between the target vehicle speed and the actual vehicle speed.

The main processing procedure shown in FIG. 2 and each subroutine shown in FIGS. 3A, and 4 to 10 are stored as a control program in a recording medium, such as a memory (ROM, back-up RAM) or a built-in hard disk drive, pre-installed in the microcomputer. However, it is possible to store the control program in a portable recording medium, such as a floppy disk, an MO (magneto-optical) disk, a CD-ROM, an external hard disk drive and a DVD (digital versatile disk), so that the control program can be arbitrarily loaded from such a recording medium to the microcomputer.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A distance control apparatus for controlling a space between two traveling vehicles, said control apparatus comprising:
   acceleration/deceleration means for accelerating and decelerating a vehicle;
   relative speed detecting means for obtaining a relative speed between two traveling vehicles;
   control ratio detecting means for obtaining a control ratio of an actual value to a target value;
   target control value generating means for generating a target control value required for controlling the space between said two traveling vehicles based on said control ratio obtained by said control ratio detecting means in addition to said relative speed obtained by said relative speed detecting means; and
   control means for activating said acceleration/deceleration means in accordance with said target control value generated by said target control value generating means.

2. The distance control apparatus in accordance with claim 1, wherein said actual value is a value directly or indirectly representing an actual distance between said two traveling vehicles, and said target value is a value directly or indirectly representing a target distance between said two traveling vehicles.

3. The distance control apparatus in accordance with claim 2, wherein said actual value is a distance deviation between said actual distance and said target distance, and said target value is said target distance.

4. The distance control apparatus in accordance with claim 2, wherein said actual value is an actual time interval obtained by dividing said actual distance by a vehicle speed, and said target value is a target time interval obtained by dividing said target distance by the vehicle speed.

5. The distance control apparatus in accordance with claim 4, wherein said actual value is a time interval deviation between said actual time interval and said target time interval, and said target value is said target time interval.

6. The distance control apparatus in accordance with claim 1, wherein said target control value is a target acceleration.

7. The distance control apparatus in accordance with claim 1, wherein said target control value is a target torque.

8. The distance control apparatus in accordance with claim 1, wherein said target control value is a target vehicle speed.

9. A distance control method for controlling a space between two traveling vehicles, said control method comprising the steps of:
   obtaining a relative speed between two traveling vehicles;
   obtaining a control ratio of an actual value to a target value;
   generating a target control value required for controlling the space between said two traveling vehicles based on said control ratio in addition to said relative speed; and
   activating an acceleration/deceleration means in accordance with said target control value.

10. The distance control method in accordance with claim 9, wherein said actual value is a value directly or indirectly representing an actual distance between said two traveling vehicles, and said target value is a value directly or indirectly representing a target distance between said two traveling vehicles.

11. The distance control method in accordance with claim 10, wherein said actual value is a distance deviation between said actual distance and said target distance, and said target value is said target distance.

12. The distance control method in accordance with claim 10, wherein said actual value is an actual time interval obtained by dividing said actual distance by a vehicle speed, and said target value is a target time interval obtained by dividing said target distance by the vehicle speed.

13. The distance control method in accordance with claim 12, wherein said actual value is a time interval deviation between said actual time interval and said target time interval, and said target value is said target time interval.

14. The distance control method in accordance with claim 9, wherein said target control value is a target acceleration.

15. The distance control method in accordance with claim 9, wherein said target control value is a target torque.

16. The distance control method in accordance with claim 9, wherein said target control value is a target vehicle speed.

17. A recording medium storing a control program for controlling a space between two traveling vehicles, said recording medium being installable in a computer system for performing the steps of:

obtaining a relative speed between two traveling vehicles;

obtaining a control ratio of an actual value to a target value;

generating a target control value required for controlling the space between said two traveling vehicles based on said control ratio in addition to said relative speed; and activating an acceleration/deceleration means in accordance with said target control value.

18. The recording medium in accordance with claim 17, wherein said actual value is a value directly or indirectly representing an actual distance between said two traveling vehicles, and said target value is a value directly or indirectly representing a target distance between said two traveling vehicles.

19. The recording medium in accordance with claim 18, wherein said actual value is a distance deviation between said actual distance and said target distance, and said target value is said target distance.

20. The recording medium in accordance with claim 18, wherein said actual value is an actual time interval obtained by dividing said actual distance by a vehicle speed, and said target value is a target time interval obtained by dividing said target distance by the vehicle speed.

21. The recording medium in accordance with claim 20, wherein said actual value is a time interval deviation between said actual time interval and said target time interval, and said target value is said target time interval.

22. The recording medium in accordance with claim 17, wherein said target control value is a target acceleration.

23. The recording medium in accordance with claim 17, wherein said target control value is a target torque.

24. The recording medium in accordance with claim 17, wherein said target control value is a target vehicle speed.

* * * * *